US009967585B2

United States Patent
Thiesse et al.

(10) Patent No.: US 9,967,585 B2
(45) Date of Patent: May 8, 2018

(54) METHOD FOR ENCODING AND DECODING IMAGES, DEVICE FOR ENCODING AND DECODING IMAGES AND CORRESPONDING COMPUTER PROGRAMS

(75) Inventors: Jean Marc Thiesse, Saint-Cloud (FR); Joël Jung, Le Mesnil Saint-Denis (FR); Marc Antonini, Sophia Antipolis (FR)

(73) Assignee: ORANGE, Paris (FR)

( * ) Notice: Subject to any disclaimer, the term of this patent is extended or adjusted under 35 U.S.C. 154(b) by 727 days.

(21) Appl. No.: 14/122,194

(22) PCT Filed: May 23, 2012

(86) PCT No.: PCT/FR2012/051158
§ 371 (c)(1),
(2), (4) Date: Apr. 25, 2014

(87) PCT Pub. No.: WO2012/160313
PCT Pub. Date: Nov. 29, 2012

(65) Prior Publication Data
US 2014/0348237 A1 Nov. 27, 2014

(30) Foreign Application Priority Data

May 26, 2011 (FR) .................................... 11 54595

(51) Int. Cl.
*H04N 19/513* (2014.01)
*H04N 19/176* (2014.01)
*H04N 19/147* (2014.01)
*H04N 19/46* (2014.01)
*H04N 19/196* (2014.01)
*H04N 19/61* (2014.01)
*H04N 19/547* (2014.01)

(52) U.S. Cl.
CPC ......... *H04N 19/513* (2014.11); *H04N 19/147* (2014.11); *H04N 19/176* (2014.11); *H04N 19/196* (2014.11); *H04N 19/46* (2014.11); *H04N 19/547* (2014.11); *H04N 19/61* (2014.11)

(58) Field of Classification Search
CPC ...... H04N 19/51; H04N 19/46; H04N 19/547; H04N 19/513; H04N 7/26; H04N 7/34; H04N 7/50
See application file for complete search history.

(56) References Cited

FOREIGN PATENT DOCUMENTS

WO 2011061089 A1 5/2011

OTHER PUBLICATIONS

International Search Report and Written Opinion dated Jul. 23, 2012 for corresponding International Application No. PCT/FR2012/051158, filed May 23, 2012.

(Continued)

*Primary Examiner* — Sathyanaraya V Perungavoor
*Assistant Examiner* — Patricia I Young
(74) *Attorney, Agent, or Firm* — David D. Brush; Westman, Champlin & Koehler, P.A.

(57) ABSTRACT

An encoding device and method are provided for encoding at least one image split into partitions. The method implements, for a current partition to be encoded, steps of: selecting at least one causal partition already encoded and then decoded; calculating at least one optimal encoding parameter associated with the selected causal partition, according to a predetermined criterion of encoding performance, by comparing a plurality of encoding parameters applied to the selected causal partition; and encoding the current partition by using the calculated optimum encoding parameter.

11 Claims, 8 Drawing Sheets

(56) References Cited

OTHER PUBLICATIONS

Figure 1:
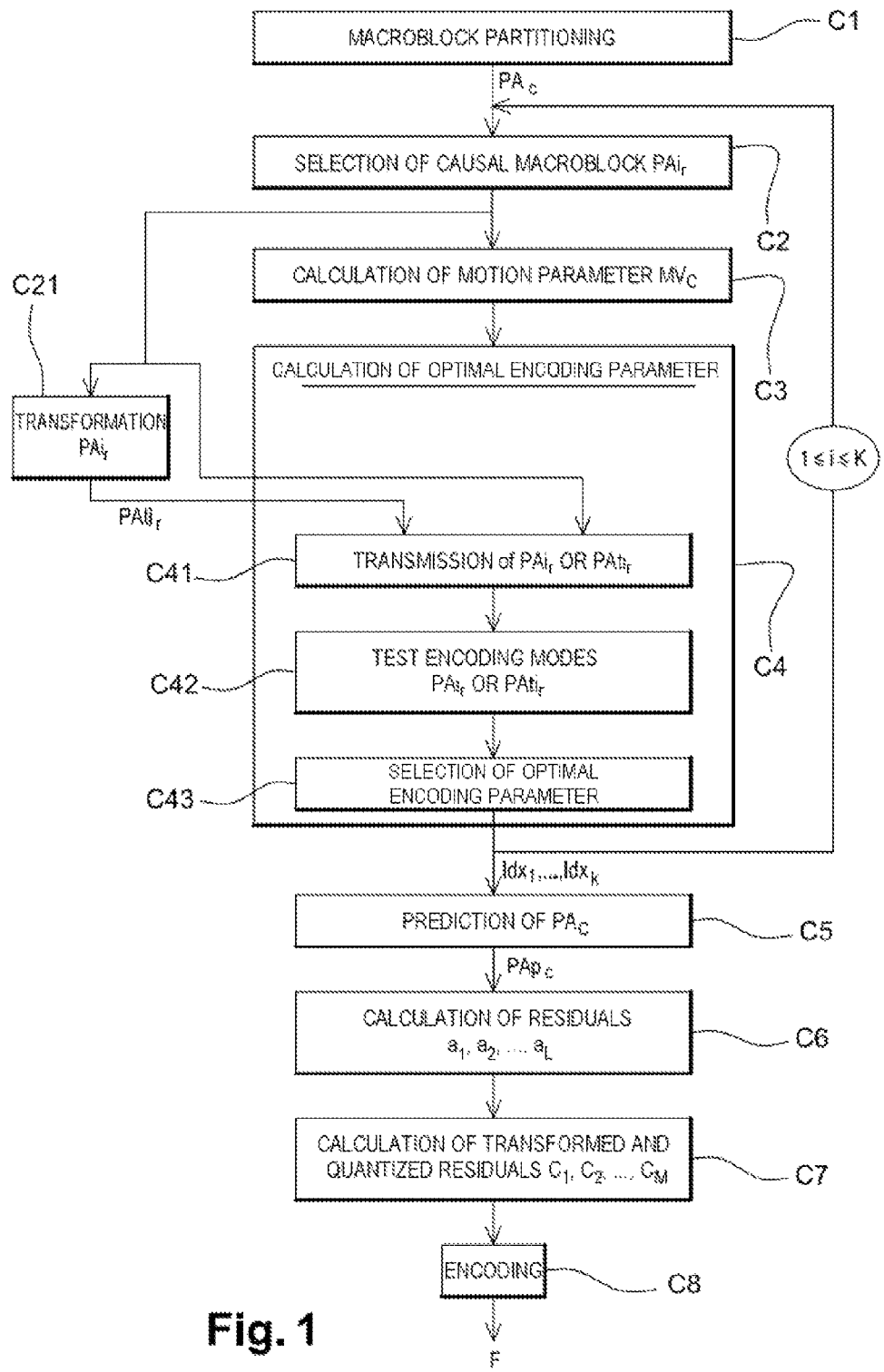

Davies et al., "Suggestion for a Test Model" 1. JCT-VC Meeting; Dresden; (Joint Collaborative Team on Video Coding of ISA/IEC JTC1/SC29/WG11 and ITU-TSG.16), May 7, 2010 (May 7, 2010), XP030007526, p. 5, line 4- p. 6, line 17, figure 3, (p. 6).

Peng Yin et al., "Localized Weighted Prediction for Video Coding", Conference Proceedings / IEEE International Symposium on Circuits and Systems (ISCAS), May 23, 2005 (May 23, 2005), pp. 4365-4368, XP010816640, IEEE Service Center, Piscataway, NJ, USA.

Jingjing Dai et al., "Motion Vector Coding Based on Predictor Selection and Boundary-Matching Estimation", IEEE International Workshop on Multimedia Signal Processing MMSP '09, Oct. 5, 2009 (Oct. 5, 2009), pp. 1-5, XP031550846, IEEE, Piscataway, NJ, USA.

Dai, J. et al: "Motion Vector Coding Based on Predictor Selection and Boundary-Matching Estimation", Multimedia Signal Processing, 2009-MMSP '09. pp. 1-5, Oct. 5-7, 2009.

Do, T. T. et al: "Compressive Sensing with Adaptive Pixel Domain Reconstruction for Block-Based Video Coding", IEEE 17th International Conference on Image Processing, Sep. 26-29, 2010, pp. 3377-3380.

Laroche, G. et al: "Intra Coding with Prediction Mode Information Inference", IEEE Transactions on Circuits and Systems for Video Technology, vol. 20, No. 12, Dec. 2010, pp. 1786-1796.

Sullivan G. J. et al: "Rate-Distortion Optimization for Video Compression", IEEE Signal Processing Magazine, Nov. 1998, pp. 74-90.

Thiesse J-M. et al: "Data Hiding of Intra Prediction Information in Chroma Samples for Video Compression", Proceedings of 2010 IEEE 17th International Conference on Image Processing, Sep. 26-29, pp. 2861-2864.

English translation of the Written Opinion of the International Searching Authority, dated Nov. 26, 2013 for corresponding International Application No. PCT/FR2012/051158, filed May 23, 2012.

METHOD FOR ENCODING AND DECODING IMAGES, DEVICE FOR ENCODING AND DECODING IMAGES AND CORRESPONDING COMPUTER PROGRAMS

CROSS-REFERENCE TO RELATED APPLICATIONS

This application is a Section 371 National Stage Application of International Application No. PCT/FR2012/051158, filed May 23, 2012, which is incorporated by reference in its entirety and published as WO 2012/160313 on Nov. 29, 2012, not in English.

DOMAIN OF THE INVENTION

The present invention relates generally to the domain of image processing, and more specifically to competition-based encoding and decoding of digital images and sequences of digital images.

More specifically, the invention relates to the compression of images or video sequences using a block representation of the video sequence.

The invention can in particular, but not exclusively, be applied to the video encoding used in existing video encoders and the amendments thereof (MPEG, H.264, H.264 SVC, H.264 MVC, etc.) or future video encoders (ITU-T/VCEG (H.265) or ISO/MPEG (HVC)), and to the corresponding decoding.

PRIOR ART

Digital images and image sequences take up a lot of memory, which requires such images to be compressed when sent to avoid congestion issues on the communication network used for such transmission, given that the useable bit rate on such networks is usually limited. Such compression is also desirable when storing such data.

Numerous techniques for compressing video data are already known. These include numerous video encoding techniques, in particular the H.264 technique, that use spatial or temporal prediction techniques on pixel block groups of a current image in relation to other pixel block groups belonging to the same image or to a previous or subsequent image.

More specifically, in the H.264 technique, I images are encoded using spatial prediction (Intra prediction) and P and B images are encoded using temporal prediction (Inter prediction) in relation to other I, P or B images encoded/decoded using motion compensation.

Such images are usually divided into macroblocks, which are themselves divided into partitions comprising a pixel set (for example 8×8). A residual partition, also known as prediction residual, is encoded for each partition, representing the original partition less a prediction. After this predictive encoding, the residual partitions are transformed by a discrete cosine transform (DCT), and then quantized. The coefficients of the quantized residual partitions are then scanned in a reading order, making it possible to take advantage of the significant number of zero coefficients in the high frequencies, and then encoded by entropy encoding.

According to the invention, a partition may consist of a block that is usually square or rectangular, although it may have a different shape, such as linear, L-shaped, etc. A partition according to the invention may also have an entirely arbitrary shape.

In the H.264 technique for example, if a macroblock is divided into blocks, a data signal corresponding to each block is sent to the decoder. Such a signal includes:
residual data that are the coefficients of the residual quantized blocks and possibly, when encoding in Inter mode, residual data of the motion vectors,
encoding parameters representing the encoding mode used, in particular:
prediction method (Intra prediction, Inter prediction, prediction by default by performing a prediction for which no information is sent to the decoder ("skip" in English);
information identifying the prediction type (orientation, reference image, etc.);
partitioning type;
transform type, for example DCT 4×4, DCT 8×8, etc.
motion information, where necessary;
etc., Decoding is performed image by image, and for each image, macroblock by macroblock. For each partition of a macroblock, the corresponding elements of the signal are read. The inverse quantification and inverse transformation of the coefficients of the blocks are carried out. The prediction of the partition is then calculated and the partition is reconstructed by adding the prediction to the decoded prediction residual.

Competition-based Intra or Inter encoding, as implemented in the H264 standard, thus relies on competitively comparing various encoding parameters, such as those mentioned above, with the aim of selecting the best encoding mode, the one that will optimize encoding of the partition considered according to a predetermined performance criterion, for example the rate/distortion cost, well known to the person skilled in the art.

The encoding parameters representing the encoding mode selected are contained in the data signal transmitted by the coder to the decoder, in the form of identifiers usually called competition indices. The decoder is thus able to identify the encoding mode selected at the coder, then to apply the prediction in accordance with this mode.

The bandwidth allocated to these competition indices is not negligible, being at least around 30%. It is also tending to increase on account of the ever-increasing range of new encoding parameters, such as new partition dimensions, new partition shapes, new Intra prediction parameters, etc. . . .

Numerous solutions have been proposed to reduce the signaling cost of such indices.

The document J.-M. Thiesse, J. Jung, M. Antonini, "Data Hiding of motion information in chroma and luma samples", *ICIP, Hong Kong*, September 2010, proposes using marking techniques to reduce the cost of encoding signaling information resulting from an improvement in Inter encoding. The main idea is to conceal encoding signaling indices in carefully selected transformed and quantized chrominance and luminance coefficients. In order to minimize the prediction error, the modification is implemented using rate-distortion optimization. The advantage of such a solution lies in that it only adds limited complexity to the decoder. Nonetheless, the number of concealed signaling indices is limited so as not to cause excessive degradation in the prediction.

The document Jingjing Dai; Au, O. C.; Wen Yang; Chao Pang; Feng Zou; Yu Liu; "Motion vector encoding based on predictor selection and boundary-matching estimation", *Multimedia Signal Processing*, 2009—MMSP '09. pp. 1-5, 5-7 Oct. 2009, proposes, when encoding a current partition, selecting at least one motion vector predictor by competition using the template matching technique. This technique is subsequently used in the decoder to obviate the need to send motion information in the encoded stream, the signaling cost of which is high. The template matching technique involves comparing the intensity of the pixels of the current partition with the intensity of the pixels of one or more causal partitions already coded then decoded, selecting the motion vector pointing towards the causal partition containing the pixels closest in intensity to the pixels of the current partition, then predicting the motion vector thus selected. One drawback of this technique is that the matching between the current partition and the causal partition selected is limited to comparison of the intensity of the pixels and does not take into account any mismatch in size or shape, for example, that there may be between the current partition to be coded (or decoded) and the causal partition. Furthermore, the causal partitions competitively compared using this technique are always those located in certain predetermined directions in relation to the current partition to be coded, i.e. usually above and to the left of the current partition. This results in imprecise prediction of the current partition, which causes non-negligible errors during encoding (or decoding) of the current partition.

The document Laroche, G.; Jung, J.; Pesquet-Popescu, B.; "Intra Encoding with Prediction Mode Information Inference," *Circuits and Systems for Video Technology, IEEE Transactions on circuits and systems for video technology*, vol. 20, no. 12, pp. 1786-1796, December 2010, proposes, for Intra encoding of a current partition, deleting one or more redundant Intra predictors from a set of predetermined Intra predictors before this set is competitively compared. Such deletion depends on a predetermined deletion criterion that does not depend on the original image to be coded and that is consequently reproducible in the decoder. Such a method undoubtedly makes it possible to use fewer Intra predictors for encoding a current partition, but it neither completely eliminates signaling costs nor takes into account the addition of new predictors.

SUMMARY OF THE INVENTION

An embodiment of the present invention relates to a method for encoding at least one image divided into partitions, such a method being noteworthy in that it implements the following steps for a current partition to be encoded:
  selection of at least one causal partition already encoded then decoded,
  calculation of at least one optimal encoding parameter associated with the causal partition selected, using a predetermined encoding performance criterion, by competitively comparing a plurality of encoding parameters applied to the causal partition selected,
  encoding of the current partition using the optimal encoding parameter calculated.

Such an approach obviates the need, in competition-based Intra or Inter encoding, to include the composition index or indices calculated in the signal to be sent to the decoder after multiple encoding parameters have been competitively compared. This generates a non-negligible reduction in signaling cost, because such an approach can be reproduced in the decoder.

Such an approach also makes it possible, for a fixed encoding parameter, to increase the number of parameters of the same type or of a similar type liable to be competitively compared. For example, in the case of Intra 8×8 or 4×4 encoding using standard H.264, for which nine spatial predictors can be competitively compared, the invention makes it possible to easily add other spatial predictors during competitive comparison, without thereby deteriorating the bit rate, while improving reconstruction of the image as a result.

According to another specific embodiment, the causal partition selection step involves:
  determining a plurality of causal partitions,
  calculating at least one optimal encoding parameter associated with each of the causal partitions using the predetermined encoding performance criterion,
  calculating at least one optimal encoding parameter associated with the current partition using the predetermined encoding performance criterion,
  comparing the optimal encoding parameter determined in relation to the current partition with each of the optimal encoding parameters determined respectively in relation to each of the causal partitions,
  selecting the causal partition with the optimal encoding parameter value closest to the optimal encoding parameter value of the current partition.

Such an approach makes causal partition selection more rigorous and more accurate than the default selection in the prior art, which uses a block matching algorithm based only on pixel correlation.

Such an approach makes it possible to select the causal partition most similar to the current partition not only in terms of texture, but also in terms of encoding mode or other representative criteria.

Such a causal partition can be located in the current image or in another image previously encoded then decoded.

In general, the causal partition may be found in any layer available at the time the current partition is coded. In particular, the causal partition may be found in a base layer or in an enhancement layer in the case of scalable video encoding. It may also be found in a layer corresponding to another view in the case of multiview video encoding.

It should be noted that, once at least one causal partition has been selected, a motion parameter defining the movement between the current partition to be coded and the causal partition selected is determined.

According to a preferred embodiment of the invention, such a motion parameter is not necessarily sent in the coded stream to the decoder, in particular if the decoder is able to recalculate this parameter itself.

Alternatively, such a motion parameter is sent in the coded stream to the decoder, which simply has to read it.

Such a motion parameter comprises for example a motion vector pointing towards the causal partition selected. Such a vector is for example calculated using at least one motion vector associated with another causal partition adjacent to the causal partition selected.

According to another specific embodiment, the current partition is coded using at least two optimal encoding parameters of different types.

Such an approach makes it possible to encode the current partition more finely, because it uses two encoding parameters of different types, both of which are selected optimally. For example, they could be a first parameter optimizing the Intra prediction of a causal partition and a second parameter optimizing the sub-sampling of the transformed and quantized residuals of the prediction of another causal partition.

Naturally, more than two optimal encoding parameters could be determined, with the precision of the encoding of a current partition being increased as a function of the number of optimal encoding parameters used.

According to another specific embodiment, at least one of the following encoding performance criteria is used:

a rate-distortion criterion, where the rate is calculated by simulation, a distortion criterion.

According to another specific embodiment, the causal partition selected comes from a prior geometric transformation, and an index associated with this transformation is then coded.

Such an approach is intended to deform a causal partition previously selected according to the invention in order to optimize the size and shape match of the latter with the current partition to be coded.

Such a transformation involves for example applying a rotation, symmetry, etc. to the causal partition, the geometric transformation type being associated with an index designed to be sent in the data stream to the decoder.

Such an approach makes it possible to further optimize prediction, which enhances the quality of the image to be reconstructed with a limited increase in encoding cost ("bit rate" in English), since a single bit is usually allocated to the geometric transformation index.

The invention also relates to a device for encoding at least one image divided into partitions, such a device being noteworthy in that it includes, for a current partition to be encoded:
- means for selecting at least one causal partition already coded then decoded,
- processing means able to calculate at least one optimal encoding parameter associated with the causal partition selected, using a predetermined encoding performance criterion, by competitively comparing a plurality of encoding parameters applied to the causal partition selected,
- means for encoding the current partition using the optimal encoding parameter calculated.

The invention also relates to a method for decoding a data signal representing at least one image divided into partitions including at least one causal partition already coded then decoded, such a decoding method being noteworthy in that it comprises the following steps for at least one current partition to be reconstructed in the aforementioned image:
- determination of at least one causal partition from at least one motion parameter associated with said current partition to be reconstructed,
- competitive comparison of a plurality of encoding parameters applied to the causal partition determined,
- determination of at least one optimal encoding parameter associated with the causal partition using a predetermined encoding performance criterion,
- reconstruction of the current partition using the optimal encoding parameter determined, which is used as the decoding parameter of the current partition.

One advantage of such a decoding method lies in the fact that the operations for determining the motion parameter and calculating the optimal encoding parameter that are performed during encoding can be reproduced during decoding. This obviates the need to send the index related to the motion parameter and the index related to the optimal encoding parameter in the data signal received by the decoder, which significantly reduces the signaling cost of such indices. As mentioned above in relation to the encoding method, the advantages of competitively comparing any of the encoding parameter types applied to the decoded causal partition are the same as the advantages obtained during encoding, and they enable decoding to obtain a reconstruction of the current partition, and ultimately of the image, that is of greater quality.

According to a specific embodiment, the motion parameter is determined by calculation or by reading it from the data signal.

According to a first alternative in which no motion parameter index is added to the signal sent to the decoder, the calculation of the motion parameter associated with the current partition to be reconstructed, which is identical to the one performed during encoding, is performed independently during decoding.

According to a second alternative, which is slightly more costly in terms of signaling than the first alternative and in which at least one motion parameter index is added to the signal to be sent to the decoder, the motion parameter associated with the current partition to be reconstructed is read during decoding by simply extracting the motion parameter from the signal received.

According to another specific embodiment, the motion parameter is a motion vector pointing towards the causal partition, such a motion vector being calculated from at least one reference motion vector that is associated with another causal partition adjacent to the causal partition.

In application of standard H264/AVC, the other causal partition is the closest one adjacent to the causal partition pointed by the motion vector. This is referred to as collocated partition. In this case, said motion vector is equal to the reference motion vector associated with this other causal partition. According to a variant, said motion vector is equal to a median of a plurality of motion vectors associated respectively with a plurality of causal partitions selected as the closest adjacent to the causal partition pointed by the motion vector.

According to another specific embodiment, the current partition is reconstructed using at least two optimal encoding parameters of different types that are used as decoding parameters for the current partition.

According to another specific embodiment, at least one of the following encoding performance criteria is used:
- a rate-distortion criterion, where the rate is calculated by simulation,
- a distortion criterion.

The choice of such encoding performance criteria enables image reconstruction quality to be optimized.

According to another specific embodiment, the causal partition results from a previous geometric transformation, said causal partition being decoded by reading an index relating to the geometric transformation from the signal.

As mentioned above in relation to the encoding method, such an approach makes it possible to optimize the choice of the causal partition used when reconstructing the current partition and therefore to increase the quality of the image to be reconstructed, with a slight increase in encoding cost ("bit rate" in English), since a single bit is allocated to the geometric transformation index.

Accordingly, the invention also relates to a device for decoding a data signal representing at least one image divided into partitions including at least one causal partition already coded then decoded, such a device being noteworthy in that it comprises, for at least one current partition to be reconstructed in the aforementioned image:
- means for determining at least one causal partition from at least one motion parameter associated with said current partition to be reconstructed,
- means for competitively comparing a plurality of encoding parameters applied to the causal partition determined, means for determining at least one optimal encoding parameter associated with the causal partition using a predetermined encoding performance criterion, means for reconstructing the current partition using the optimal encoding parameter determined, which is used as the decoding parameter of the current partition.

The invention also relates to a computer program containing instructions for implementing one of the methods according to the invention, when run on a computer.

This program can use any programming language, and may be source code, object code, or intermediate code between source code and object code, such as in a partially compiled form, or in any other form required.

The invention also relates to a computer-readable storage medium containing a computer program, this program containing the instructions for implementing one of the methods according to the invention, as described above.

The data medium can be any unit or device able to store the program. For example, the medium may be a storage medium, such as a ROM, for example a CD ROM or a microelectronic circuit ROM, or a magnetic storage medium, for example a floppy disk or a hard disk.

Moreover, the data medium may be a transmittable medium such as an electric or optical signal, that can be routed via an electrical or optical cable, by radio or using other means. The program according to the invention may in particular be downloaded from an Internet network.

Alternatively, the data medium may be an integrated circuit incorporating the program, the circuit being designed to run or to be used in the running of the present method.

The decoding method, the encoding device, the decoding device and the computer programs mentioned above provide at least the same benefits as provided by the encoding method according to the present invention.

SHORT DESCRIPTION OF THE DRAWINGS

Figure 2:
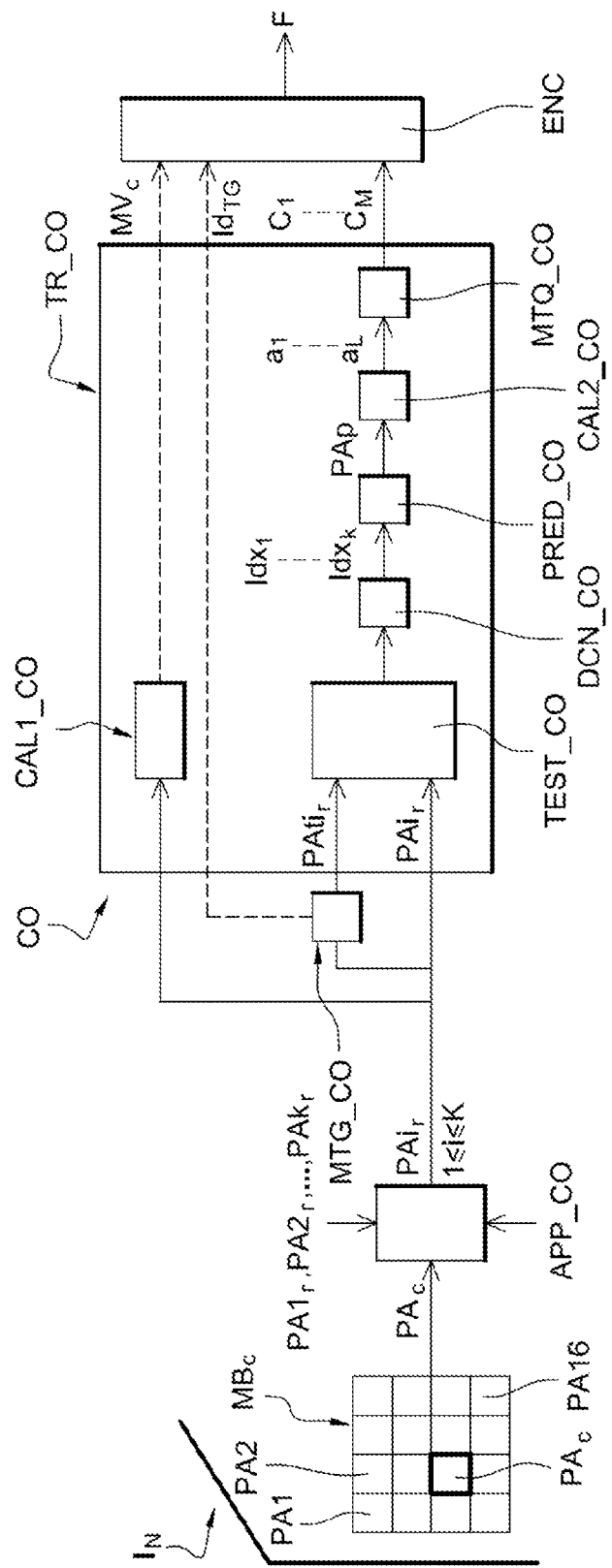
Figure 3:
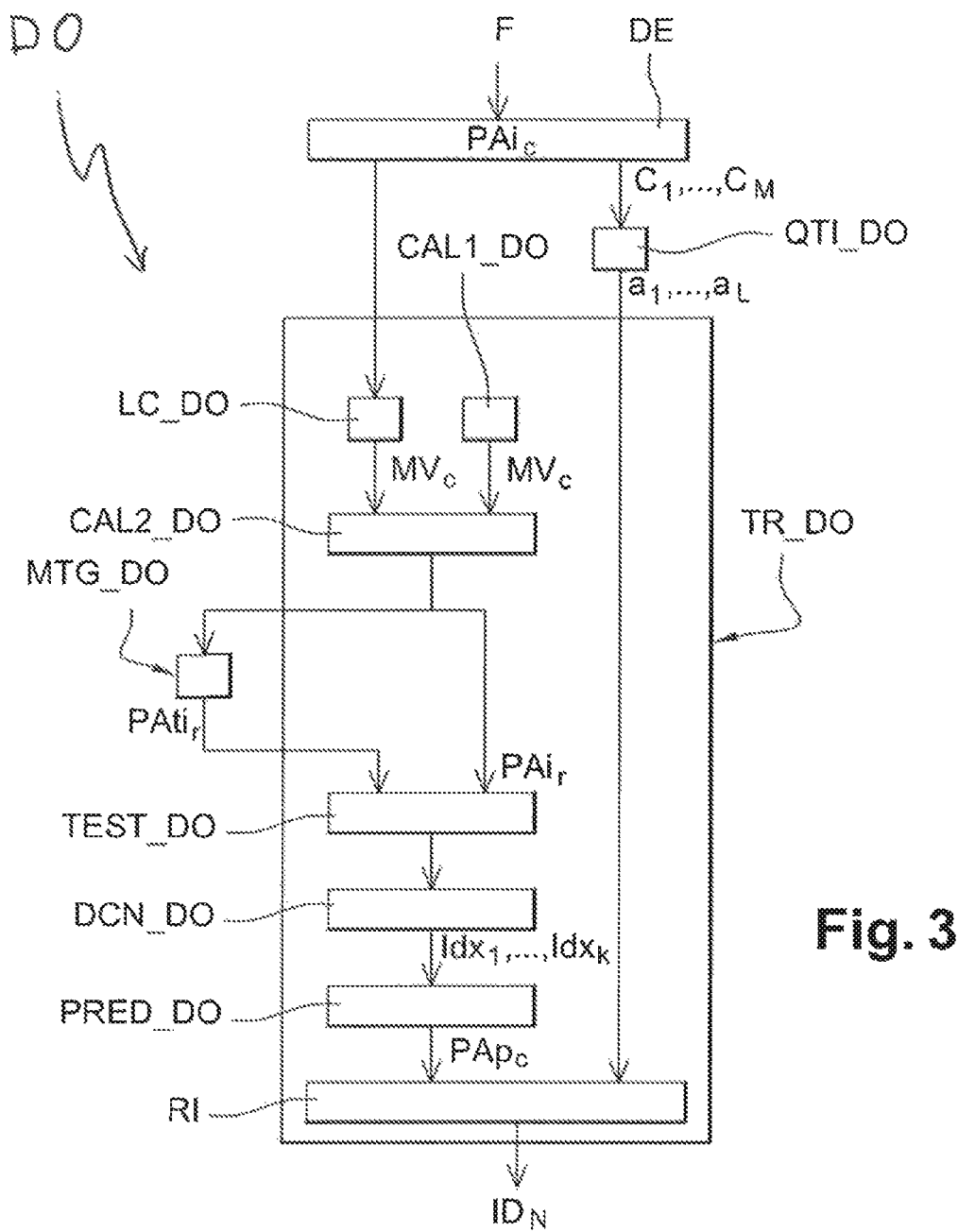
Figure 4:
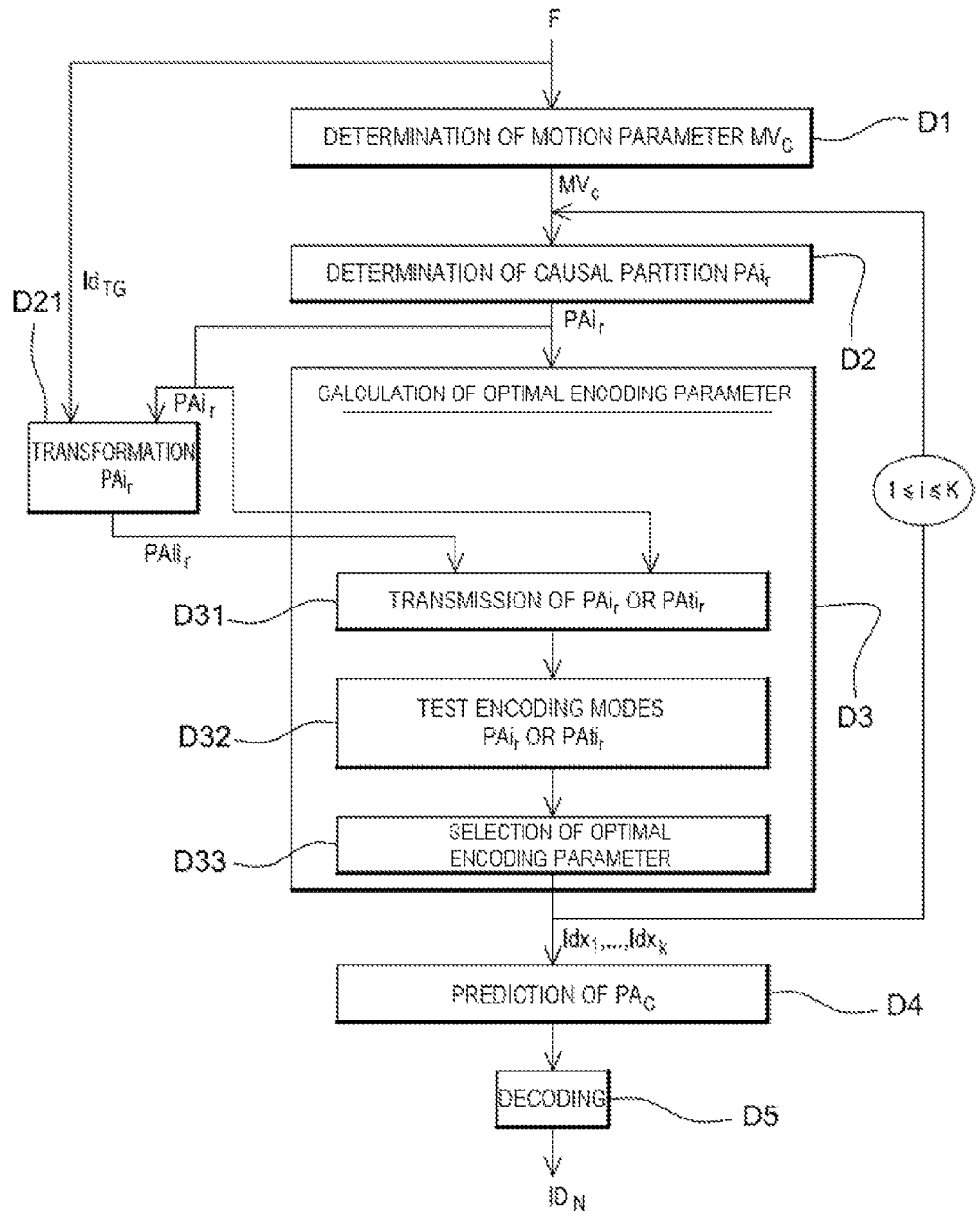
Figure 5A:
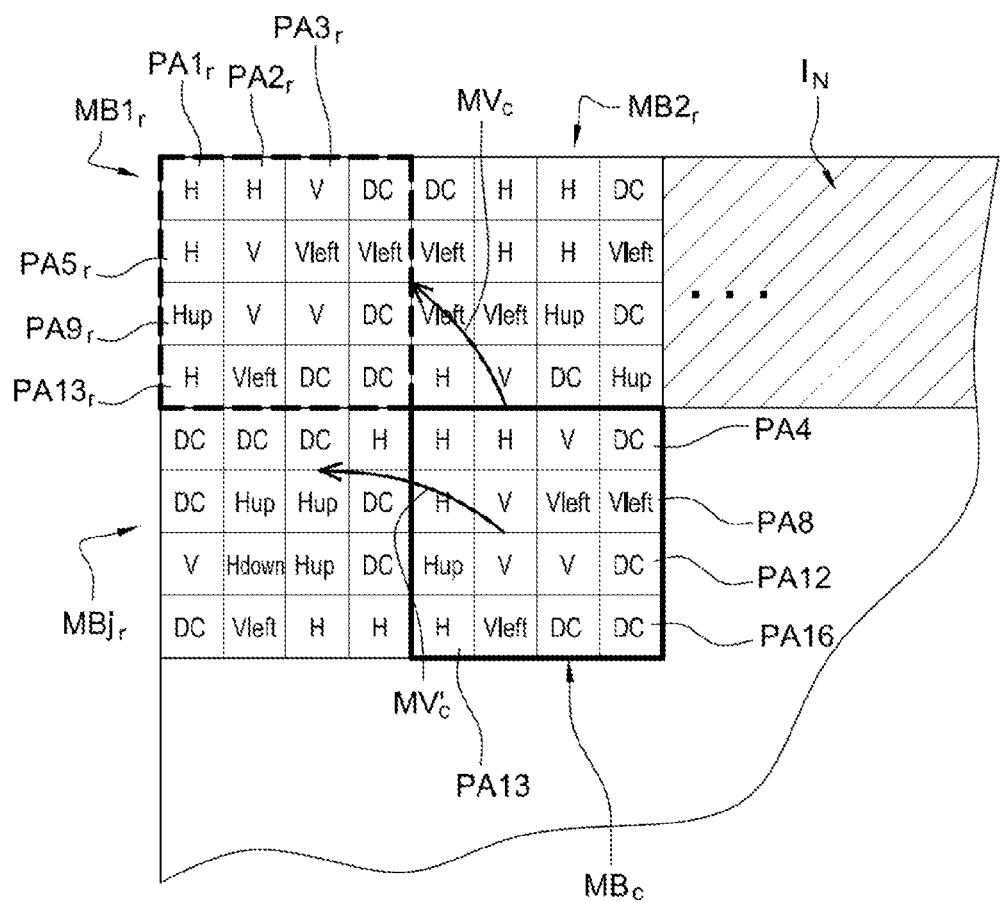
Figure 5B:
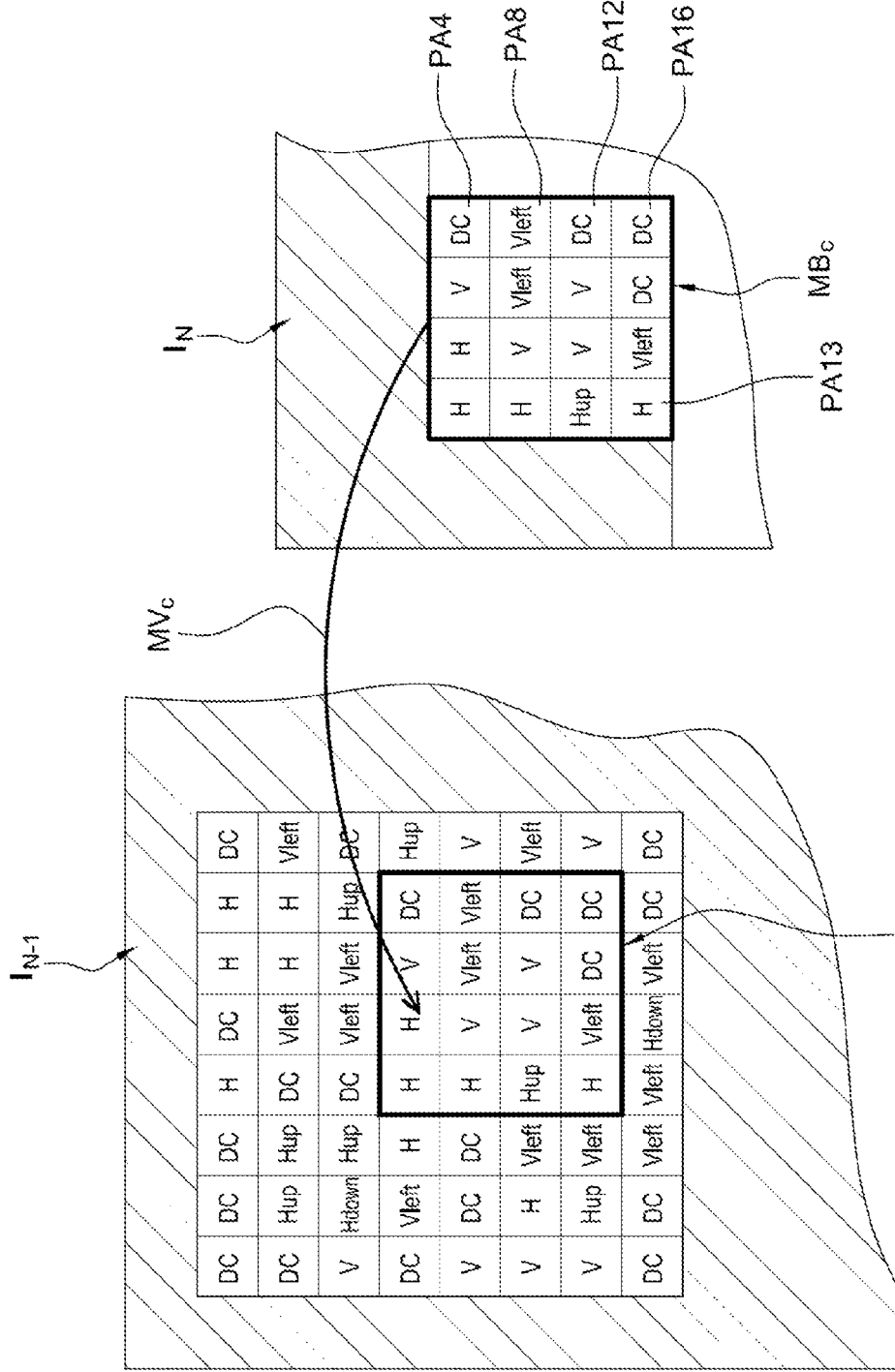
Figure 6:
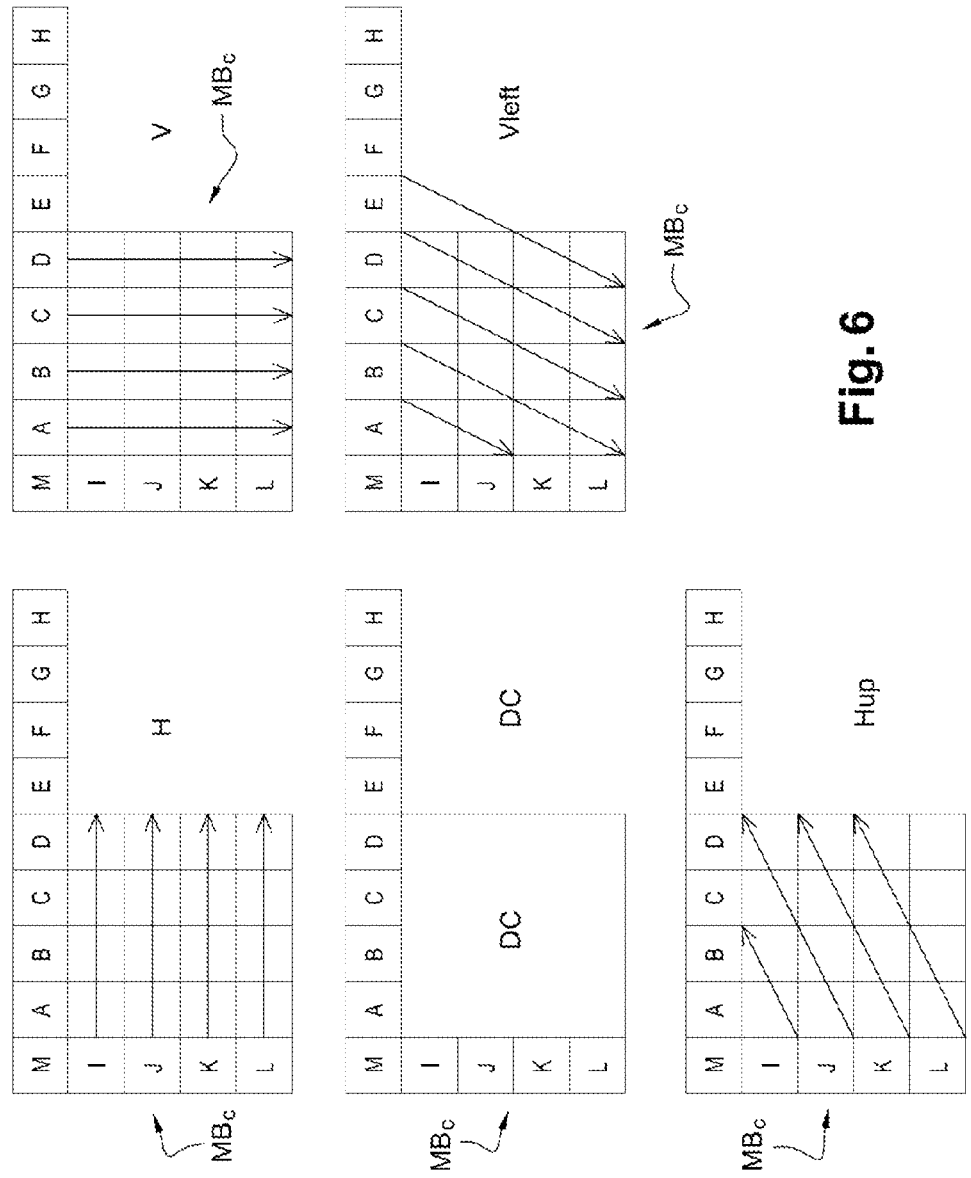
Figure 7:
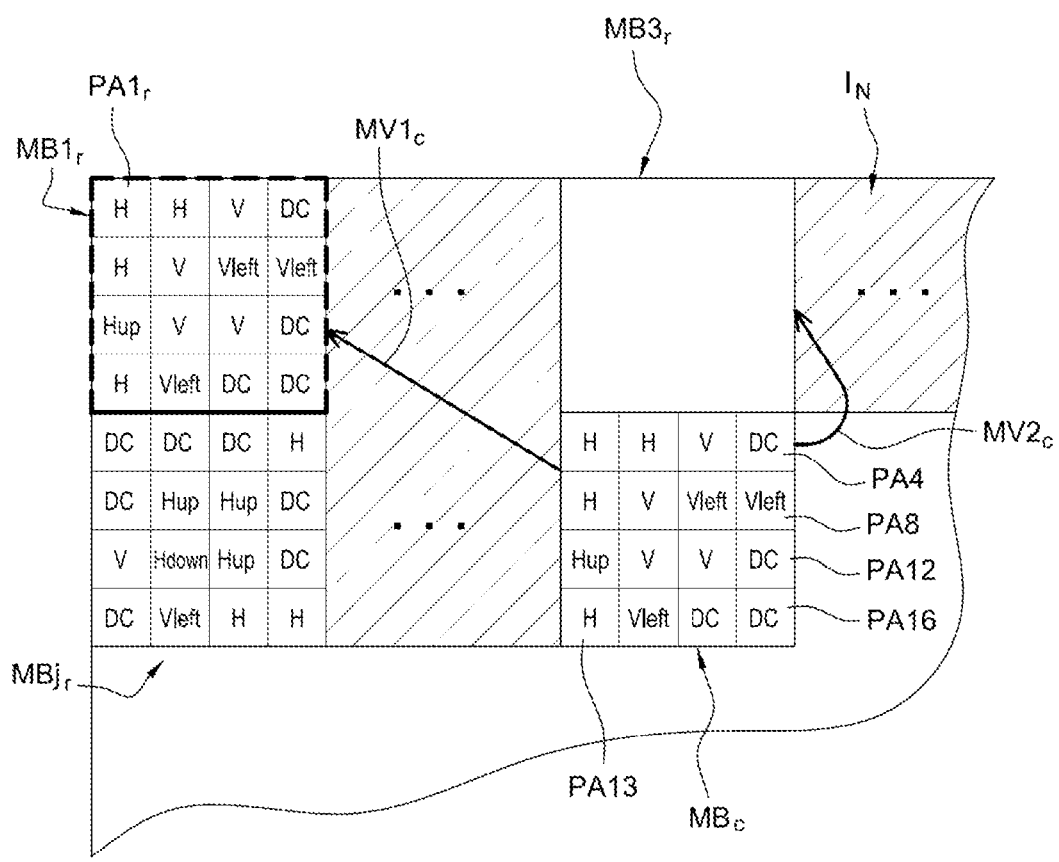

Other features and advantages are set out in a preferred embodiment described with reference to the figures, in which:

FIG. 1 shows the steps of the encoding method according to the invention,

FIG. 2 shows an embodiment of an encoding device according to the invention, FIG. 3 shows an embodiment of a decoding device according to the invention, FIG. 4 shows the steps of the decoding method according to the invention, FIG. 5A shows an example of determination of optimal Intra predictors, FIG. 5B shows an example of determination of optimal Inter predictors, FIG. 6 shows different spatial predictors, FIG. 7 shows an example of determination of two encoding parameters of different types.

DETAILED DESCRIPTION

Detailed Description of the General Principle of the Invention

An embodiment of the invention, in which the encoding method according to the invention is used to encode a sequence of images using a bit stream similar to the one obtained by encoding using standard H.264/MPEG-4 AVC, is described below. In this embodiment, the encoding method according to the invention is for example implemented as software or hardware by modifying a coder initially compliant with standard H.264/MPEG-4 AVC. The encoding method according to the invention is shown in the form of an algorithm comprising steps C1 to C8, as shown in FIG. 1.

According to the embodiment of the invention, the encoding method according to the invention is implemented in an encoding device CO shown in FIG. 2.

During a first step C1, a current macroblock $MB_C$ of an image $I_N$ is initially divided into a plurality of partitions PA1, PA2, . . . , PAn as shown in FIG. 2. Such a step is conventionally performed by a partitioning software module not shown.

Such a partitioning module uses for example an exhaustive competition-based selection method or a selection method based on a previously determined algorithm. Such methods are well known to the person skilled in the art (see G. J. Sullivan and T. Wiegand, "Rate-distortion optimization for video compression", *IEEE Signal Proc. Mag.*, pp. 74-90, 1998), and as such will not be further described below.

The different types of possible partitioning algorithms are grouped in a database (not shown) of the coder CO. They make it possible to divide the image or the macroblocks of this image into a plurality of partitions, which may be rectangular, square, or have another geometric shape, such as a substantially linear shape, or an entirely arbitrary shape.

In the example shown in FIG. 2, a current macroblock $MB_C$ of the current image $I_N$ is divided into 16 partitions PA1, PA2, . . . , PA16. These partitions obtained all have for example a square block shape and are all of the same size.

During a step C2 shown in FIG. 1, at least one causal partition $PAi_r$ is selected from a plurality K of available causal partitions $PA1_r, PA2_r, \ldots, PAi_r, \ldots PAK_r$, ($1 \le i \le K$), i.e. a partition previously coded then decoded, in order to encode a current partition $PA_c$ ($1 \le c \le n$) of the current image $I_N$.

For this purpose, a matching software module APP_CO shown in FIG. 2 is designed to select, from all of the aforementioned causal partitions, a first causal partition that most resembles the current partition $PA_c$, using a conventional block matching criterion applied to the pixel domain, or using a characteristic function of the current partition $PA_c$, such as projection onto a transformed domain or onto the domain of the encoding mode of the latter, as described below.

The causal partition selected $PAi_r$ either belongs to an image coded then decoded before image $I_N$, or to said image $I_N$.

In order to optimize the size and shape matching of the causal partition selected $PAi_r$ with the current partition to be coded $PA_c$, said causal partition is geometrically deformed, during an optional step C21, by applying a geometric transformation such as rotation or symmetry thereto using a widely known geometric transformation software module MTG_CO, as shown in FIG. 2. On completion of said step, a transformed causal partition $Pati_r$ is obtained.

During a step C3, a motion parameter defining the movement between the current partition PAc and the causal partition selected $PAi_r$ is calculated. Such a motion parameter is for example a motion vector $MV_c$.

Such a step is executed by a first calculation software sub-module CAL1_CO belonging to a processing software module TR_CO, as shown in FIG. 2.

Since said motion parameter information is expensive to send to the decoder, any conventional method for reducing the cost of this information can be used (skip, motion prediction, etc.).

During a step C4 shown in FIG. 1, according to the invention at least one optimal encoding parameter associated with said causal partition selected $PAi_r$, or with said transformed causal partition selected $PAti_r$, is calculated using a predetermined encoding performance criterion by competitively comparing a plurality of encoding parameters associated with said causal partition selected $PAi_r$ or $PAti_r$.

According to the invention, the encoding parameters represent the encoding mode used and are, not exclusively, of the type defined below:
- prediction method (Intra prediction, Inter prediction, prediction by default by performing a prediction for which no information is sent to the decoder ("skip" in English);
- information identifying the prediction type (orientation, reference image, etc.);
- partitioning type;
- transform type, for example DCT 4×4, DCT 8×8, wavelets, etc.;
- etc.

For this purpose, during a sub-step C41, the causal partition $PAi_r$ selected in the aforementioned step C2 or the causal partition $PAti_c$ transformed in the aforementioned step C21 is sent to a sub-module TEST_CO for testing encoding modes, as shown in FIG. 2.

During a sub-step C42 shown in FIG. 1, the sub-module TEST_CO calculates the different possible encoding modes for the causal partition $PAi_r$ or the transformed causal partition $PAti_r$ considered.

Once the different possible encoding modes have been tested by the test sub-module TEST_CO, during a sub-step C43 shown in FIG. 1, a decision sub-module DCN_CO, shown in FIG. 2, selects at least a first type of encoding parameter $Idx_1$ associated with an optimal encoding mode, such a selection being the optimal prediction according to a predetermined performance criterion that, in the example shown, is the rate-distortion criterion well known to the person skilled in the art. Such a criterion is expressed by the equation (1) below:

$$J = D + \lambda R \text{ where} \quad (1)$$

D is the distortion between the original partition and the reconstructed partition, R is the bit cost of encoding the encoding parameters, and $\lambda$ represents a Lagrange multiplier.

According to a variant that is particularly advantageous in terms of reducing calculation time in the coder, the predetermined performance criterion only depends on the distortion and is expressed by the equation (2) below:

$$J' = D. \quad (2)$$

The criteria J and J' are conventionally calculated by simulation.

A first type of optimal encoding parameter obtained on completion of step C43 is for example the Inter 8×8 prediction mode of the causal partition selected $PAi_r$.

The aforementioned steps C2 to C43 are repeated for the K−1 other causal partitions selected, which makes it possible to obtain at least K−1 other optimal encoding parameters idx2, idx3, ..., idxK.

During a step C5 shown in FIG. 1, a calculation software sub-module PRED_CO, shown in FIG. 2, predicts the current partition $PA_c$, using the optimal encoding parameters idx1, idx2, idx3, ..., idxK selected during step C43, in relation to at least one of the causal partitions $PA1_r$, $PA2_r$, ..., $PAK_r$.

On completion of this step, a predicted current partition $PAp_c$ is delivered.

During a step C6 shown in FIG. 1, which only takes place for certain optimal encoding parameters selected, a second calculation sub-module CAL2_CO, shown in FIG. 2, determines the residual data $a_1, a_2, \ldots, a_L$ by comparison of the data relating to the current partition $PA_c$ with the data relating to the predicted current partition $PAp_c$ obtained.

During a step C7 shown in FIG. 1, the residual data $a_1, a_2, \ldots, a_L$ are sent to a transform and quantization sub-module MTQ_CO, shown in FIG. 2, to undergo a transform, for example a discrete cosine transform, followed by quantization.

It is assumed that, for the predicted current partition $PAp_c$, M transformed and quantized residual data are obtained on completion of step C7. Such transformed and quantized residual data are marked for example $c_1, c_2, \ldots, c_M$.

During a step C8 shown in FIG. 1, the predicted current partition $PAp_c$ is then advantageously coded by inheritance of the optimal encoding parameters selected in the aforementioned step C43. A data signal F is then delivered on completion of step C8.

Such encoding is performed by a coder ENC as shown in FIG. 2. Such a coder is for example compliant with standard H.264/MPEG-4 AVC.

According to the invention, the data signal F advantageously does not contain the optimal encoding parameters selected in step C43 since these parameters are associated with causal partitions already coded then decoded, and therefore available to the decoder. There is therefore no need to send this data in the data signal F, which may contain the following:
- motion information $MV_c$ obtained in the aforementioned step C3, exclusively if the decoder is not able to recalculate this information itself,
- a geometric transformation index $Id_{TG}$ as shown in FIG. 2, exclusively if the geometric transformation of a causal partition was undertaken in step C21 in FIG. 1,
- the coded values of the coefficients $c_1, c_2, \ldots, c_M$, if they exist.

The data signal F is then sent using a transmission interface (not shown) of the coder CO, over a communication network, to a remote terminal. The latter has a decoder DO as shown in FIG. 3.

The signal F is first sent to an entropy decoding software module DE, the decoding being the inverse to that performed by the coder ENC shown in FIG. 2. Then, for a current partition to be reconstructed $PAi_c$, the decoded coefficients $c_1, c_2, \ldots, c_M$, if they exist, are sent to an inverse-transform and inverse-quantization module QTI_DO that delivers the residual data $a_1, a_2, \ldots, a_L$ obtained in the aforementioned encoding step C6.

A processing software module TR_DO, as shown in FIG. 3, then implements steps D1 to D5 of the decoding method according to the invention, as shown in FIG. 4.

Such a decoding method according to the invention is also implemented as software or hardware by modifying a decoder initially compliant with standard H.264/MPEG-4 AVC.

During a first step D1 shown in FIG. 4, a motion parameter $MV_c$ associated with the current partition to be reconstructed $PAi_c$ is determined. Such a motion parameter is for example a motion vector $MV_c$.

If the data signal F does not contain any motion parameters, a calculation sub-module CAL1_DO, as shown in FIG. 3, calculates said motion vector $MV_c$ relating to the movement between the current partition to be reconstructed $PA_c$ and a causal partition $PAi_r$.

If the motion vector $MV_c$ is contained in the data signal F, a reading sub-module LC_DO reads this information in the data signal F received.

During a step D2 shown in FIG. 4, the causal partition $PAi_r$ pointed by the motion vector $MV_c$ read by the reading sub-module LC_DO in the data signal F or calculated by the reading sub-module CAL1_DO is determined. Such a step is implemented by a second calculation sub-module CAL2_DO as shown in FIG. 3.

If the data signal F contains a geometric transformation index $Id_{TG}$ indicating that the causal partition $PAi_r$ has undergone a geometric transformation such as rotation, symmetry, etc. in the coder CO, said causal partition $PAi_r$ undergoes a geometric deforming in a step D21 shown in FIG. 4 by applying to said causal partition the geometric transformation indicated by the index $Id_{TG}$ using a geometric transformation software module MTG_DO as shown in FIG. 3, which is entirely identical to the geometric transformation software module MTG_CO in FIG. 2. On completion of said step, a transformed causal partition $PAti_r$ is obtained.

During a step D3 shown in FIG. 4, according to the invention at least one optimal encoding parameter associated with said causal partition determined $PAi_r$, or with said transformed causal partition determined $PAti_r$, is calculated using a predetermined encoding performance criterion by competitively comparing a plurality of encoding parameters associated with said causal partition selected.

Said encoding parameters are of the same type as those mentioned above in the description of the encoding method.

For this purpose, during a sub-step D31 shown in FIG. 4, the causal partition $PAi_r$ determined in the aforementioned step D2 or the transformed causal partition $Pati_r$ determined in the aforementioned step D21 is sent to a sub-module TEST_DO for testing encoding modes, as shown in FIG. 3.

During a sub-step D32 shown in FIG. 4, the sub-module TEST_DO calculates the different possible encoding modes for the causal partition $PAi_r$ or the transformed causal partition $PAti_r$ considered.

Once the different possible encoding modes have been tested by the test sub-module TEST_DO, during a sub-step D33 shown in FIG. 4, a decision sub-module DCN_DO, shown in FIG. 3, selects at least a first type of encoding parameter $Idx_1$ associated with an optimal encoding mode, such a selection being the optimal prediction according to a predetermined performance criterion that, in the example shown, is the rate-distortion criterion well known to the person skilled in the art. Such a criterion is expressed by the equation (1) below:

$$J = D + \lambda R \text{ where} \qquad (1)$$

D is the distortion between the original partition and the reconstructed partition, R is the bit cost of encoding the encoding parameters, and $\lambda$ represents a Lagrange multiplier.

According to a variant that is particularly advantageous in terms of reducing calculation time in the coder, the predetermined performance criterion only depends on the distortion and is expressed by the equation (2) below:

$$J' = D. \qquad (2)$$

A first type of optimal encoding parameter obtained on completion of step D33 is for example the Inter 8×8 prediction mode of the causal partition determined $PAi_r$.

The aforementioned steps D2 to D33 are repeated for K−1 other causal partitions liable to be determined, which makes it possible to obtain at least K−1 other optimal encoding parameters idx2, idx3, . . . , idxK.

During a step D4 shown in FIG. 4, a calculation software sub-module PRED_DO, shown in FIG. 3, predicts the current partition $PAi_c$ to be reconstructed in relation to at least one causal partition from K causal partitions $PA1_r$, $PA2_r$, . . . , $PAK_r$ already coded then decoded, using optimal encoding parameters idx1, idx2, idx3, . . . , idxK obtained in step D33 and used as decoding parameter, and, if they exist, the residual data $a_1, a_2, \ldots, a_L$ delivered by the inverse-quantization and inverse-transform module QTI_DO as shown in FIG. 3.

On completion of this step, a predicted current partition $PAp_c$ is delivered.

The predicted current partition $PAp_c$ is then decoded, during a step D5, by adding to the latter, if they exist, the residual data $a_1, a_2, \ldots, a_L$ delivered by the inverse-quantization and inverse-transform module QTI_DO as shown in FIG. 3. Such a step is implemented using a reconstruction sub-module RI compliant with standard H.264/MPEG-AVC.

Once all of the partitions PA1, . . . , PAn of the image $I_N$ have been decoded, the image-reconstruction sub-module RI provides an image $ID_N$ corresponding to the decoding of the image $I_N$ as output from the decoder DO.

Detailed Description of a First Embodiment

A first embodiment is described below for an Intra-mode encoding/decoding method.

Several types of Intra encoding/decoding modes are proposed in standard H264/MPEG-AVC depending on the way the current macroblock is partitioned. For Intra 16×16 encoding, the macroblock is treated as a single partition that is predicted in relation to a set of four spatial predictors. In the case of Intra 8×8 or 4×4 encoding, each smaller block is predicted in relation to a set of nine spatial predictors including the four spatial predictors used in Intra 16×16 encoding.

Such competition-based Intra encoding/decoding, as implemented in the H264/MPEG-AVC standard, relies on competitively comparing the different spatial predictors mentioned above, with the aim of selecting the best predictor, i.e. the predictor that will optimize encoding of the current partition according to a performance criterion, for example the rate/distortion cost.

The fact that there are many such predictors increases the competition-information bit rate caused by these multiple predictors. Consequently, the option of competitively comparing new Intra predictors is currently avoided, although they might optimize Intra prediction.

The invention proposes applying the encoding and decoding steps described above for Intra-mode encoding/decoding, without being specifically limited to the number of spatial predictors already provided for in standard H264/MPEG-AVC, and applying competition-based encoding/decoding to new Intra predictors liable to be proposed in the future.

As in the example shown in FIG. 2, the current macroblock $MB_C$ of the current image $I_N$ is divided during the aforementioned step C1 into sixteen partitions PA1, PA2, . . . , PA16. These partitions obtained all have for example a square block shape and are all of the same size. The macroblock $MB_C$ thus divided is shown in FIG. 5A. For the sake of clarity in the drawing, only partitions PA4, PA8, PA12, PA13 and PA16 are shown.

During a subsequent step that groups together the aforementioned steps C2 and C4, as shown in FIG. 1, for each of the partitions PA1 to PA16, at least one causal macroblock containing a plurality K of available causal partitions $PA1_r$, $PA2_r$, ..., $PAi_r$, ... $PAK_r$, ($1 \leq i \leq K$) is selected.

In the example shown in FIG. 5A, such a selection is effected according to a prediction-mode correlation criterion between the current partitions to be predicted in the current macroblock $MB_C$ and the causal partitions of a causal macroblock included in a number E of available causal macroblocks $MB1_r$, $MB2_r$, ..., $MBj_r$, ... $MBE_r$, where $1 \leq j \leq E$. For the sake of clarity in the drawing, only causal macroblocks $MB1_r$, $MB2_r$ and $MBj_r$ are shown, the remaining causal macroblocks being shown schematically using hatching.

For this purpose, the following is performed:
calculation of the optimal spatial predictors for each of the partitions of the current macroblock $MB_C$ considered,
calculation of the optimal spatial predictors for each of the partitions of a causal macroblock considered.

On completion of the calculation, the optimal spatial predictors relating to each of the current partitions PA1 to PA16 of the current macroblock $MB_C$ are respectively H, H, V, DC, H, V, Vleft, Vleft, Hup, V, V, DC, H, Vleft, DC, DC.

With reference to FIG. 6, the predictors H, V, DC, Vleft and Hup correspond respectively to 5 possible directions from the nine possible prediction directions in Intra-encoding mode, in relation to which a current partition can be predicted in relation to a causal partition contained in the same image. These five directions conventionally include:
horizontal, marked H,
vertical, marked V,
the direction formed by the mean of the two previous directions, marked DC,
a first diagonal direction, marked V left,
a second diagonal direction, marked Hup.

As shown in FIG. 5A, the causal macroblock for which the optimal spatial predictors calculated are most similar to those calculated in relation to the current macroblock $MB_c$ is the first causal macroblock $MB1_r$. This causal macroblock $MB1_r$ is therefore selected.

The causal macroblock $MB1_r$ obtained using the mode correlation criterion is a better choice than would have been made using conventional block matching, since it takes into account the correlation between the current macroblock $MB_C$ and the causal macroblocks, predictor by predictor. On the other hand, in the case of conventional block matching, the spatial predictors of the causal macroblock selected may be different from the optimal predictors actually calculated for said causal macroblock, which significantly decreases the accuracy of the selection of this causal macroblock.

The aforementioned step C3 in which the motion vector $MV_C$ between the current macroblock $MB_C$ and the causal macroblock $MB1_r$ is calculated is also performed.

Each of the current partitions PA1 to PA16 of the current macroblock $MB_C$ is then predicted during the aforementioned step C5, using the optimal predictors calculated respectively for each of the partitions of the causal macroblock $MB1_r$.

The aforementioned steps C6 to C8 are then implemented to encode the current macroblock $MB_C$.

The data signal F sent to the decoder DO on completion of step C8 may contain the motion vector $MV_C$ and any residual data that exists. On the other hand, the data signal F advantageously does not contain the optimal predictor or predictors of the causal macroblock or macroblocks calculated in the aforementioned step C4, since these predictors are associated with macroblocks that have already been coded then decoded, and as such they can be determined independently by the decoder DO.

With reference to FIG. 4, the aforementioned decoding step D1 is then applied to the coded data signal F to decode the motion vector $MV_C$ calculated in step C3.

The causal macroblock $MB1_r$ pointed by the motion vector $MV_C$ is then determined during the aforementioned decoding step D2.

The optimal predictors are then calculated for each of the partitions of the causal macroblock $MB1_r$ by implementing the aforementioned step D3. According to the first embodiment, these are the spatial predictors H, H, V, DC, H, V, Vleft, Vleft, Hup, V, V, DC, H, Vleft, DC, DC associated respectively with partitions $PA1_r$ to $PA16_r$ of the causal macroblock $MB1_r$.

During the aforementioned step D4, the current macroblock $MB_C$ to be reconstructed is predicted in relation to the causal macroblock $MB1_r$, using the optimal spatial predictors H, H, V, DC, H, V, Vleft, Vleft, Hup, V, V, DC, H, Vleft, DC, DC.

On completion of this step, a predicted current macroblock $MBp_C$ is delivered.

During the aforementioned step D5, the predicted current macroblock $MBp_C$ is then reconstructed.

The invention is obviously not limited to the fact that the causal macroblock or macroblocks are systematically selected from the current image $I_N$.

With reference to FIG. 5B, which shows a variant of the embodiment in FIG. 5A, the causal macroblock $MB1_r$ is found in a previously coded/decoded image and not in the current image $I_N$. Such a previously coded/decoded image is for example image $I_{N-1}$, which immediately precedes the current image $I_N$.

According to such a variant, the encoding/decoding steps described above with reference to FIG. 5A are reproduced identically with the causal macroblock $MB1_r$ selected in the image $I_{N-1}$, and as such are not described below.

Detailed Description of a Second Embodiment

A second embodiment is described below for an encoding/decoding method in which an iterative compressed sampling method is applied ("compressed sensing" in English). This is a conventional method and is described for example in the document T. T. Do, Xiaoan Lu, and J. Sole. "Compressive sensing with adaptive pixel domain reconstruction for block-based video encoding". *Proceedings of 2010 IEEE 17th International Conference on Image Processing*, pages 3377-3380, 2010.

This method makes it possible to eliminate several transformed and quantized residual coefficients, and then to efficiently reconstruct the corresponding current partition. However, to optimize efficiency, such a method requires a large number of parameters. The reduced signaling cost advantageously obtained by the method on account of the elimination of the aforementioned coefficients is therefore unfavorably increased on account of the need to add this large number of parameters to the data signal to be transmitted to the decoder. This cost increase reduces the value of this method.

The following parameters are used in this method:
sub-sampling parameters,
acquisition operators, such as transform type: DCT, wavelets, etc.,
reconstruction operators,
parameters used by the reconstruction algorithm.

The present invention advantageously enables this iterative method to be applied without impacting the signaling costs of such parameters, since the latter are advantageously not included in the data signal sent to the decoder.

As in the example shown in FIG. 2, the current macroblock $MB_C$ of the current image $I_N$ is divided during the aforementioned step C1 into sixteen partitions PA1, PA2, . . . , PA16. These partitions obtained all have for example a square block shape and are all of the same size. The macroblock $MB_C$ thus divided is for example identical to the one shown in FIG. 5A.

During the aforementioned step C2, as shown in FIG. 1, for each of the partitions PA1 to PA16, at least one causal macroblock containing a plurality K of available causal partitions $PA1_r$, $PA2_r$, . . . , $PAi_r$, . . . $PAK_r$, ($1 \le i \le K$) is selected.

In the example shown, this selection is made using a conventional block-matching criterion. The macroblock thus selected is for example the macroblock $MBj_r$ shown in FIG. 5A.

Alternatively, such a selection is performed using a modified block-matching criterion. This criterion involves selecting the causal macroblock with the transformed residual data closest to the transformed residual data of the current macroblock $MB_C$.

During the aforementioned step C3, as shown in FIG. 1, the motion vector $MV'_C$ between the current macroblock $MB_C$ and the causal macroblock $MBj_r$ is calculated. The motion vector $MV'_C$ is shown in FIG. 5A.

During the aforementioned step C4, as shown in FIG. 1, one or more optimal encoding parameters relating to the causal macroblock $MBj_r$ are calculated.

For this purpose, the weighting coefficients, sub-sampling parameters, acquisition operators, reconstruction operators or a combination of these elements are competitively compared, according to the aforementioned rate-distortion criterion J or J', for each of the partitions of the causal macroblock selected $MBj_r$, to determine at least one optimal encoding parameter from these elements.

On completion of step C4, it is for example a sub-sampling parameter that is considered to optimize the encoding of each of the causal partitions of the causal macroblock selected $MBj_r$.

Each of the current partitions PA1 to PA16 of the current macroblock $MB_C$ is then predicted during the aforementioned step C5. On completion of this step, a predicted current macroblock $MBp_c$ is delivered.

During the aforementioned step C6, as shown in FIG. 1, the residual data $a_1, a_2, \ldots, a_L$ are determined by comparing the data relating to the current macroblock $MB_c$ with the data relating to the predicted current macroblock obtained $MBp_c$.

During the aforementioned step C7, as shown in FIG. 1, the residual data $a_1, a_2, \ldots, a_L$ are transformed then quantized to obtain the coefficients $c_1, c_2, \ldots, c_M$.

According to the second embodiment, following step C7, only some of the coefficients $c_1, c_2, \ldots, c_M$ are kept following a sub-sampling (not shown) of the latter using said optimal sub-sampling parameter determined in step C4.

The aforementioned step C8, as shown in FIG. 1, is then implemented to encode the current macroblock $MB_C$.

The data signal F sent to the decoder DO on completion of step C8 may contain the motion vector $MV'_C$ if the decoder DO is not able to recalculate it independently and, according to the second embodiment, the residual data calculated in step C6. On the other hand, the data signal F advantageously does not contain the sub-sampling parameter determined in the aforementioned step C4, since this parameter is associated with the causal macroblock $MBj_r$ that has already been coded and decoded, and as such can be determined independently by the decoder DO.

With reference to FIG. 4, the aforementioned decoding step D1 is then applied to the coded data signal F to decode the motion vector $MV'_C$ calculated in step C3.

The causal macroblock $MBj_r$ pointed by the motion vector $MV'_C$ is then determined during the aforementioned decoding step D2.

The optimal encoding parameters are then calculated for each of the partitions of the causal macroblock $MBj_r$ by implementing the aforementioned step D3. According to the second embodiment, this calculation step delivers an optimal sub-sampling parameter for each of the causal partitions of the causal macroblock $MBj_r$.

During the aforementioned step D4, each of the current partitions PA1 to PA16 of the current macroblock $MB_C$ to be reconstructed are predicted conventionally in order to deliver a predicted current macroblock $MBp_c$.

During the aforementioned step D5, the predicted current macroblock $MBp_C$ is then reconstructed by adding the residual data included in the data signal F to the predicted current macroblock $MBp_C$, and by sub-sampling of the coefficients $c_1, c_2, \ldots, c_M$, generated by transforming and quantizing said residual data using the optimal sub-sampling parameter calculated in step D3.

Detailed Description of a Third Embodiment

A third embodiment is described below for an encoding/decoding method incorporating the Intra or Inter prediction described in the first embodiment and a iterative compressed sampling method as described in the second embodiment.

Such an embodiment provides at least two optimal encoding parameters from implementation of the first and second embodiments respectively. Such an approach makes it possible to encode a current macroblock more precisely, since two optimal parameters of different types are used, instead of just one.

It is assumed that, according to the first embodiment, Intra prediction is used.

As in the example shown in FIG. 2, the current macroblock $MB_C$ of the current image $I_N$ is divided during the aforementioned step C1 into sixteen partitions PA1, PA2, . . . , PA16. These partitions obtained all have for example a square block shape and are all of the same size. The macroblock $MB_C$ thus divided is shown in FIG. 7. For the sake of clarity in the drawing, only partitions PA4, PA8, PA12, PA13 and PA16 are shown.

As in the first embodiment, during steps C2 and C4, for each of the partitions PA1 to PA16 of the current macroblock $MB_C$, at least one causal macroblock containing a plurality K of available causal partitions $PA1_r$, $PA2_r$, . . . , $PAi_r$, . . . $PAK_r$, ($1 \le i \le K$) is selected.

In the example shown in FIG. 7, such a selection is effected in the same way as in the first embodiment, i.e. according to a prediction-mode correlation criterion between the current partitions to be predicted in the current macroblock $MB_C$ and the causal partitions of a causal macroblock included in a number E of available causal macroblocks $MB1_r$, $MB2_r$, . . . , $MBj_r$, . . . $MBE_r$, where $1 \le j \le E$. For the sake of clarity in the drawing, only causal macroblocks $MB1_r$, $MB3_r$ and $MBj_r$ are shown, the remaining causal macroblocks being shown schematically using hatching.

For this purpose, the following is performed:
calculation of the optimal spatial predictors for each of the partitions of the current macroblock $MB_C$ considered,
calculation of the optimal spatial predictors for each of the partitions of a causal macroblock considered.

On completion of the calculation, the optimal spatial predictors relating to each of the current partitions PA1 to PA16 of the current macroblock $MB_C$ are respectively H, H, V, DC, H, V, Vleft, Vleft, Hup, V, V, DC, H, Vleft, DC, DC.

As shown in FIG. 7, the causal macroblock for which the optimal spatial predictors calculated are most similar to those calculated in relation to the current macroblock $MB_c$ is the first causal macroblock $MB1_r$. Causal macroblock $MB1_r$ is therefore selected.

The aforementioned step C3 in which the motion vector $MV1_C$ between the current macroblock $MB_C$ and the causal macroblock $MB1_r$ is calculated is also performed.

In parallel to this, steps C2 to C4, as described above in relation to the second embodiment, are implemented to obtain the optimal compressed sampling parameters for a given causal macroblock.

During the aforementioned step C2, for each of the partitions PA1 to PA16 of the current macroblock $MB_C$, at least one causal macroblock containing a plurality K of available causal partitions $PA1_r, PA2_r, \ldots, PAi_r, \ldots PAK_r$, ($1 \leq i \leq K$) is selected.

In the example shown in FIG. 7, this selection is made using a conventional block-matching criterion. The causal macroblock selected is for example macroblock $MB3_r$.

Alternatively, such a selection is performed using a modified block-matching criterion.

During the aforementioned step C3, a motion vector $MV2_C$ between the current macroblock $MB_C$ and the causal macroblock $MB3_r$ just selected in step C2 is calculated.

During step C4, one or more optimal encoding parameters relating to the causal macroblock selected $MB3_r$ are calculated.

For this purpose, the weighting coefficients, sub-sampling parameters, acquisition operators, reconstruction operators or a combination of these elements are competitively compared, according to the aforementioned rate-distortion criterion J or J', for each of the partitions of the causal macroblock selected, to determine at least one optimal encoding parameter from these elements.

On completion of step C4, it is for example a sub-sampling parameter that is considered to optimize the encoding of the causal macroblock selected $MB3_r$.

Each of the current partitions PA1 to PA16 of the current macroblock $MB_C$ is then predicted during the aforementioned step C5, using the optimal predictors calculated respectively for each of the partitions of the causal macroblock $MB1_r$ and also in relation to each of the partitions of the causal macroblock $MB3_r$.

During the aforementioned step C6, the residual data $a_1, a_2, \ldots, a_L$ are determined by comparing the data relating to the current macroblock $MB_c$ with the data relating to the predicted current macroblock obtained $MBp_c$.

During the aforementioned step C7, the residual data $a_1, a_2, \ldots, a_L$ are transformed then quantized to obtain the coefficients $c_1, c_2, \ldots, c_M$.

According to the third embodiment, following step C7, only some of the coefficients $c_1, c_2, \ldots, c_M$ are kept following a sub-sampling (not shown) of the latter using said optimal sub-sampling parameter determined in step C4.

The aforementioned step C8 is then implemented to encode the current macroblock $MB_C$.

The data signal F sent to the decoder DO on completion of step C8 may contain the motion vectors $MV1_C$ and $MV2_C$ calculated in the aforementioned step C3 if the decoder DO is not able to recalculate them independently, along with the residual data calculated in step C6. On the other hand, the data signal F advantageously contains neither the spatial predictors nor the sub-sampling parameter determined in the aforementioned step C4, since the latter are associated with causal macroblocks $MB1_r$ and $MB3_r$, which have already been coded then decoded, and as such they can be determined independently by the decoder DO.

The motion vectors $MV1_C$ and $MV2_C$ calculated in step C3 are decoded during the aforementioned decoding step D1.

The causal macroblocks $MB1_r$ and $MB3_r$ pointed respectively by the motion vectors $MV1_C$ and $MV2_C$ are then determined during the aforementioned decoding step D2.

During the aforementioned step D3, the optimal predictors H, H, V, DC, H, V, Vleft, Vleft, Hup, V, V, DC, H, Vleft, DC, DC associated respectively with partitions $PA1_r$ to $PA16_r$ of the causal macroblock $MB1_r$ are calculated. During this same step, the optimal sub-sampling parameter is calculated for each of the causal partitions of the causal macroblock $MBj_r$.

During the aforementioned step D4, the current macroblock $MB_C$ to be reconstructed is predicted:
firstly in relation to the causal macroblock $MB1_r$, using the optimal spatial predictors H, H, V, DC, H, V, Vleft, Vleft, Hup, V, V, DC, H, Vleft, DC, DC,
and secondly in relation to the causal macroblock $MB3_r$.

On completion of this step, a predicted current macroblock $MBp_c$ is delivered.

During the aforementioned step D5, the predicted current macroblock $MBp_C$ is then reconstructed by adding the residual data sent in the data signal F to the predicted current macroblock $MBp_C$, and by sub-sampling of the coefficients $c_1, c_2, \ldots, c_M$, generated by transforming and quantizing said residual data using the optimal sub-sampling parameter calculated in step D3.

Naturally, the embodiments described above are provided exclusively for illustrative purposes and are in no way limiting, and numerous modifications could easily be made by the person skilled in the art without thereby moving outside the scope of the invention.

The invention claimed is:

1. A method for encoding at least one image divided into partitions, wherein the method comprises:
the following acts for a current partition to be encoded:
selection by an encoding device of at least one causal partition already coded then decoded,
calculation by the encoding device, after said selected causal partition has been coded then decoded, of at least one optimal encoding parameter for said selected causal partition, using a predetermined encoding performance criterion, by competitively comparing a plurality of encoding parameters applied to said selected causal partition, and
encoding by the encoding device of the current partition using said optimal encoding parameter calculated for said selected causal partition; and
transmitting with a transmission interface a data signal containing the encoded current partition over a communication network without transmitting the optimal encoding parameter.

2. The encoding method as claimed in claim 1, during which said causal partition-selection act involves:
   determining a plurality of causal partitions,
   calculating at least one optimal encoding parameter associated with each of said causal partitions using said predetermined encoding performance criterion,
   calculating at least one optimal encoding parameter associated with said current partition using said predetermined encoding performance criterion,
   comparing the optimal encoding parameter calculated in relation to said current partition with each of the optimal encoding parameters calculated respectively in relation to each of said causal partitions,
   selecting the causal partition with the optimal encoding parameter value closest to the optimal encoding parameter value of said current partition.

3. The encoding method as claimed in claim 1, during which said selected causal partition results from a prior geometric transformation, said method including an act in which an index associated with said prior geometric transformation is encoded.

4. A method for decoding a data signal representing at least one image divided into partitions including at least one causal partition, wherein the method comprises:
   receiving the data signal from a communication network;
   performing the following acts by a decoding device for at least one current partition to be reconstructed in said image:
   determination of at least one causal partition, which is already decoded by the decoding device, from at least one motion parameter associated with said current partition to be reconstructed,
   competitive comparison by a decoding device of a plurality of encoding parameters applied to said determined causal partition,
   determination by the decoding device of at least one optimal encoding parameter for said determined causal partition using a predetermined encoding performance criterion, and
   reconstruction by the decoding device of said current partition using said optimal encoding parameter determined for said determined causal partition, which is used as the decoding parameter of said current partition, the decoding parameter used for decoding the current partition not being received with the data signal.

5. The decoding method as claimed in claim 4, in which said motion parameter is determined by calculation or by reading said motion parameter from said data signal.

6. The decoding method as claimed in claim 4, in which the motion parameter is a motion vector pointing towards said causal partition, said motion vector being calculated from at least one motion vector associated with another causal partition adjacent to said causal partition.

7. The decoding method as claimed in claim 4, in which the current partition is reconstructed using at least two optimal encoding parameters of different types that are used as decoding parameters for said current partition.

8. The decoding method as claimed in claim 4, during which the encoding performance criterion is selected from at least one of the criteria in the group consisting of:
   a rate-distortion criterion, where the rate is calculated by simulation,
   a distortion criterion.

9. The decoding method as claimed in claim 4, in which said causal partition results from a prior geometric transformation, said transformation being determined by reading an index relating to said prior geometric transformation from said signal.

10. A device for decoding a data signal representing at least one image divided into partitions including at least one causal partition, wherein the decoding device comprises:
    a processor; and
    a non-transitory computer-readable medium comprising instructions stored thereon, which when executed by the processor configure the processor to perform acts comprising:
    receiving the data signal from a communication network; and
    for at least one current partition to be reconstructed in said image:
    determining at least one causal partition, which is already decoded by the decoding device, from at least one motion parameter associated with said current partition to be reconstructed,
    competitively comparing a plurality of encoding parameters applied to said determined causal partition,
    determining at least one optimal encoding parameter for said determined causal partition using a predetermined encoding performance criterion, and
    means for reconstructing said current partition using said optimal encoding parameter determined for said determined causal partition, which is used as the decoding parameter of said current partition, the decoding parameter used for decoding the current partition not being received with the data signal.

11. A non-transitory computer-readable storage medium containing a computer program with instructions that configure a computer to perform acts of a method for decoding a data signal representing at least one image divided into partitions including at least one causal partition, for at least one current partition to be reconstructed in said image, when said program is run by a computer, wherein the instructions comprise:
    instructions that configure the computer to receive the at least one current partition from a data signal sent over a communication network;
    instructions that configure the computer to determine at least one causal partition, which is already decoded, from at least one motion parameter associated with said current partition to be reconstructed,
    instructions that configure the computer to perform a competitive comparison of a plurality of encoding parameters applied to said determined causal partition,
    instructions that configure the computer to determine at least one optimal encoding parameter for said determined causal partition using a predetermined encoding performance criterion, and
    instructions that configure the computer to reconstruct said current partition using said optimal encoding parameter determined for said determined causal partition, which is used as the decoding parameter of said current partition, the decoding parameter used for decoding the current partition not being received with the data signal.

* * * * *